(12) United States Patent
Skinner et al.

(10) Patent No.: US 10,471,618 B2
(45) Date of Patent: *Nov. 12, 2019

(54) CONTROL OF A CUTTING TOOL

(71) Applicant: Milwaukee Electric Tool Corporation, Brookfield, WI (US)

(72) Inventors: Luke J. Skinner, West Bend, WI (US); Burtrom L. Stampfl, Bristol, WI (US); Timothy J. Bartlett, Hartford, WI (US); Carter H. Ypma, Milwaukee, WI (US); Timothy R. Obermann, Waukesha, WI (US); Benjamin O. Cabot, Milwaukee, WI (US); Kris J. Kanack, Whitewater, WI (US); Thomas C. Hanks, Wauwatosa, WI (US); Ian C. Zimmermann, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/370,908

(22) Filed: Dec. 6, 2016

(65) Prior Publication Data

US 2017/0157787 A1 Jun. 8, 2017

Related U.S. Application Data

(60) Provisional application No. 62/264,622, filed on Dec. 8, 2015.

(51) Int. Cl.
*B26D 5/00* (2006.01)
*B26D 7/22* (2006.01)
(Continued)

(52) U.S. Cl.
CPC .............. *B26D 5/005* (2013.01); *B26D 7/22* (2013.01); *G05B 19/042* (2013.01); *H02G 1/005* (2013.01);
(Continued)

(58) Field of Classification Search
CPC .......... H02G 1/005; B26D 5/005; B26D 7/22; G05B 19/042; G05B 2219/35414; G05B 2219/15117
See application file for complete search history.

(56) References Cited

U.S. PATENT DOCUMENTS 4,463,496 A 8/1984 Reich et al.
5,979,215 A 11/1999 Lefavour et al.
(Continued)

FOREIGN PATENT DOCUMENTS

EP 2332682 B1 6/2011
FR 2778032 B1 10/1999
(Continued)

OTHER PUBLICATIONS

PICOUP-EXP-240-I, Application Information Sheet, dated Oct. 15, 2012; Revised Sep. 6, 2007.
(Continued)

*Primary Examiner* — Anthony Ho
(74) *Attorney, Agent, or Firm* — McDonnell Boehnen Hulbert & Berghoff LLP

(57) ABSTRACT

An example system includes a cutting tool and a device configured to remotely control the cutting tool. In response to receiving information indicative of actuation of a first user interface item, the device sends a first signal to the cutting tool so as to request enabling the cutting tool to be operated remotely. The cutting tool sends a second signal to the device indicating that remote operation of the cutting tool has been enabled. The cutting tool receives information
(Continued)

indicating that the trigger has been activated, and sends a third signal to the device indicating that the cutting tool is ready to perform a cutting operation. The device receives information indicative of actuation of a second user interface item, and responsively, sends a fourth signal to the cutting tool so as to cause the cutting tool to perform the cutting operation.

21 Claims, 13 Drawing Sheets

(51) Int. Cl.
    *G05B 19/042*     (2006.01)
    *H02G 1/00*     (2006.01)
(52) U.S. Cl.
    CPC ............... *G05B 2219/15117* (2013.01); *G05B 2219/35414* (2013.01)

(56) References Cited

U.S. PATENT DOCUMENTS

| | | | |
|---|---|---|---|
| 6,666,064 | B2 | 12/2003 | LeFavour et al. |
| 7,240,490 | B2 | 7/2007 | Baumuller et al. |
| 2005/0150343 | A1 | 7/2005 | Deimel et al. |
| 2012/0279615 | A1 | 11/2012 | Terrell |
| 2014/0110021 | A1 | 4/2014 | Devine |
| 2014/0157522 | A1 | 6/2014 | Lorini |
| 2017/0259446 | A1* | 9/2017 | Skinner .................. B26D 5/005 |

FOREIGN PATENT DOCUMENTS

| | | |
|---|---|---|
| FR | 2863536 B1 | 6/2005 |
| WO | 2005060638 A2 | 7/2005 |

OTHER PUBLICATIONS

ECC100VAT: Safety Device Cable Cutting Head, Application Information Sheet, dated Mar. 1, 2009.
HYDROPIC-INT Tool for CAT. EHV Mains, Application Information Sheet, dated Mar. 1, 2009.
PICOUP-EXP-300-I, Application Information Sheet, dated Mar. 1, 2009.
PICOUP-EXP-350I, Dual Stage Tool for CAT, dated Oct. 1, 2009.
PICOUP 2: Single Stage Tool for CAT(*) L.V. and M.V. Mains, Application Information Sheet, dated Apr. 18, 2001, Revised Sep. 12, 2011.

* cited by examiner

CONTROL OF A CUTTING TOOL

FIELD

The present disclosure relates generally to control of a cutting tool.

BACKGROUND

A cutting tool may include one or more movable blades that are actuatable by a hydraulic or electromechanical actuation system. By providing power to the actuation system, the blades move relative to each other to perform operations such as cutting, crimping, separation, blanking, etc.

SUMMARY

The present disclosure describes embodiments that relate to apparatuses and methods associated with control of a cutting tool. In a first example implementation, the present disclosure describes a cutting tool. The cutting tool includes a body; two blades coupled to the body; an actuator coupled to the body and configured to cause the two blades to move relative to each other; and a controller coupled to the body. The controller is in wireless communication with a remote device, and the controller is configured to perform operations. The operations include: (i) receiving a first signal from the remote device indicating a request to operate the cutting tool remotely; (ii) receiving information indicating that a trigger coupled to the body has been locked in an "on" state; (iii) sending a second signal to the remote device indicating that the trigger has been locked in the "on" state; and (iv) in response to receiving a third signal from the remote device, causing the actuator to move the two blades relative to each other to cut a cable placed therebetween.

In a second example implementation, the present disclosure describes a device configured to remotely control a cutting tool. The device includes a user interface comprising a plurality of user interface items; at least one processor; and date storage comprising instructions that, when executed by the at least one processor, cause the device to perform operations. The operations include: (i) receiving information indicative of actuation of a first user interface item of the plurality of interface items; (ii) responsively, sending a first signal to the cutting tool so as to request enabling the cutting tool to be operated remotely; (iii) receiving a second signal from the cutting tool indicating that the cutting tool is ready to perform a cutting operation; (iv) receiving information indicative of actuation of a second user interface item of the plurality of interface items; and (v) responsively, sending a third signal to the cutting tool so as to cause the cutting tool to perform the cutting operation.

In a third example implementation, the present disclosure describes a system. The system includes a cutting tool that includes a body, two blades coupled to the body, and an actuator coupled to the body and configured to cause the two blades to move relative to each other. The system also includes a device configured to remotely control the cutting tool. The device includes a user interface comprising a plurality of user interface items. In response to receiving information indicative of actuation of a first user interface item of the plurality of interface items, the device sends a first signal to the cutting tool so as to request enabling the cutting tool to be operated remotely. Also, in response to (i) receiving the first signal, and (ii) actuation of a trigger coupled to the cutting tool, the cutting tool sends a second signal to the device indicating that remote operation of the cutting tool has been enabled. Further, the cutting tool receives information indicating that the trigger has been locked in an "on" state, and responsively sends a third signal to the device indicating that the cutting tool is ready to perform a cutting operation. The device then receives information indicative of actuation of a second user interface item of the plurality of interface items, and responsively, sends a fourth signal to the cutting tool so as to cause the cutting tool to perform the cutting operation.

In a fourth example implementation, the present disclosure describes performing the following operations: (i) enabling a cutting tool to be operated remotely in response to receiving a first signal from a remote device, where the cutting tool includes a body, two blades coupled to the body, and an actuator coupled to the body and configured to cause the two blades to move relative to each other, and where the cutting tool is in wireless communication with the remote device; (ii) receiving information indicating that a trigger coupled to the body of the cutting tool has been locked in an "on" state; (iii) sending a second signal to the remote device indicating that the trigger has been locked in the "on" state; and (iv) in response to receiving a third signal from the remote device, causing the actuator to move the two blades relative to each other to cut a cable placed therebetween.

In a fifth example implementation, the present disclosure describes performing the following operations: (i) receiving information indicative of actuation of a first user interface item of a plurality of interface items of a device configured to remotely control a cutting tool; (ii) responsively, sending a first signal to the cutting tool so as to request enabling the cutting tool to be operated remotely; (iii) receiving a second signal from the cutting tool indicating that remote operation of the cutting tool has been enabled; (iv) receiving a third signal from the cutting tool indicating that the cutting tool is ready to perform a cutting operation; (v) receiving information indicative of actuation of a second user interface item of the plurality of interface items; and (vi) responsively, sending a fourth signal to the cutting tool so as to cause the cutting tool to perform the cutting operation.

In a sixth example implementation, the present disclosure describes a non-transitory computer readable medium having stored therein instructions that, when executed by a computing device, cause the computing device to perform operations in accordance with the fourth example implementation. In a seventh example implementation, the present disclosure describes a non-transitory computer readable medium having stored therein instructions that, when executed by a computing device, cause the computing device to perform operations in accordance with the fifth example implementation. Further additional example implementations are described as well that include any combination of the implementations.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. OVERVIEW

In examples, electrical equipment may be maintained while operating at high voltages. An example maintenance operation may involve cutting a live line. In this example, it is desirable to perform a cable cutting operation by way of a remotely controlled cutting tool so as to insulate workers from any electrical hazards.

In other examples, the line might not be easily reachable. For instance, the cable may be in an underwater environment, and may thus be cut via remote control of the cutting tool. Disclosed herein are systems, devices, and methods for remote control of a cutting tool to insulate workers from hazardous environments.

II. EXAMPLE SYSTEMS

Figure 1:
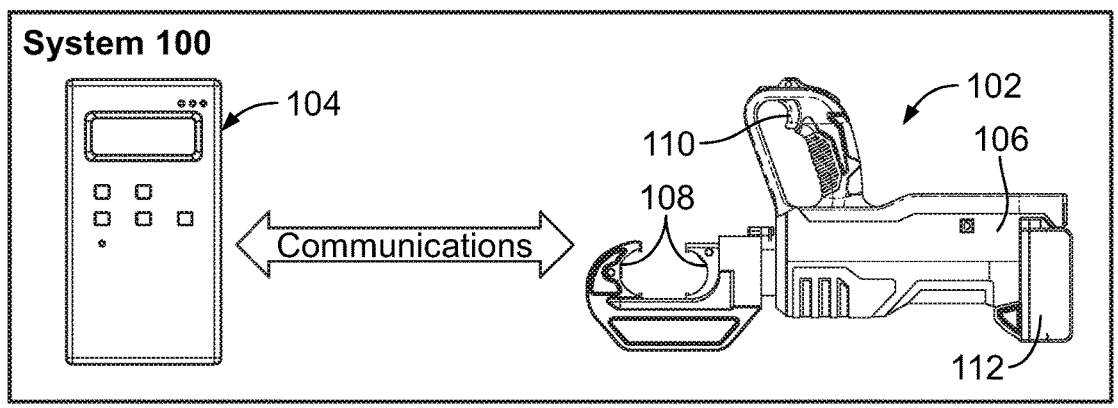
FIG. 1 illustrates a system, in accordance with an example implementation.

FIG. 1 illustrates a cutting tool system 100, in accordance with an example implementation. The system 100 includes a cutting tool 102, and a device 104 configured to remotely control the cutting tool 102. The cutting tool 102 includes a body 106 and one or more blades 108. The cutting tool 102 may also include a trigger 110. In one preferred arrangement, the trigger 110 is physically onboard the cutting tool. The trigger 110 is capable of being actuated to as to initiate a cutting operation of the cutting tool 102.

In examples, the cutting tool may be electromechanically actuated. For instance, the cutting tool 102 may include an electric motor configured to cause a spindle to rotate, thus causing an actuator coupled to the spindle to move linearly. The actuator may be coupled to at least one of the blades 108, and may cause the blades 108 to move relative to each other to cut a cable disposed therebetween. The motor, spindle, and actuator may be coupled to the body 106.

In another example, the cutting tool may be hydraulically actuated. For instance, a motor may be configured to drive a hydraulic pump, which pressurizes hydraulic fluid and provides the pressurized fluid to an actuator (e.g., a linear hydraulic cylinder). A piston of the actuator may be coupled to at least one of the blades 108 such that motion of the piston may cause the blades 108 to move relative to each other. Other actuation mechanisms are possible.

Also, in examples, the cutting tool 102 may be powered by a battery 112. However, the cutting tool 102 may be coupled to an electric line that provides power to the cutting tool 102.

In examples, the cutting tool 102 may include two blades 108. In an example, motion of the actuator may cause both blades 108 to move relative to each other. In another example, the actuator may cause one blade to move, while the other blade remains stationary. In still another example, the cutting tool 102 may include only one blade 108 movable by the actuator.

Further, the cutting tool 102 may include a controller coupled to or embedded within the body 106. The controller may be configured to operate the cutting tool 102. For example, the controller may be in communication with sensors coupled to the cutting tool 102. The controller may also be in communication with the trigger 110 and components of the actuation mechanism of the cutting tool 102. For instance, if the trigger 110 is pulled, the controller may, in response cause power from the battery 112 to be provided to the actuation mechanism. The controller may further operate the actuation mechanism based on sensor inputs. Example sensor inputs include position sensor information indicating position of an actuator, pressure sensor information indicating hydraulic pressure in chambers of a hydraulic actuator, etc.

Additionally, the cutting tool 102 may include one or more antennae that facilitate sending and receiving messages to and from other devices, such as the device 104.

The device 104 can be, for example, a mobile phone, personal digital assistant (PDA), laptop, notebook, or netbook computer, tablet computing device, etc. The device 104 may have a user interface to interact with operators/users.

Figure 2:
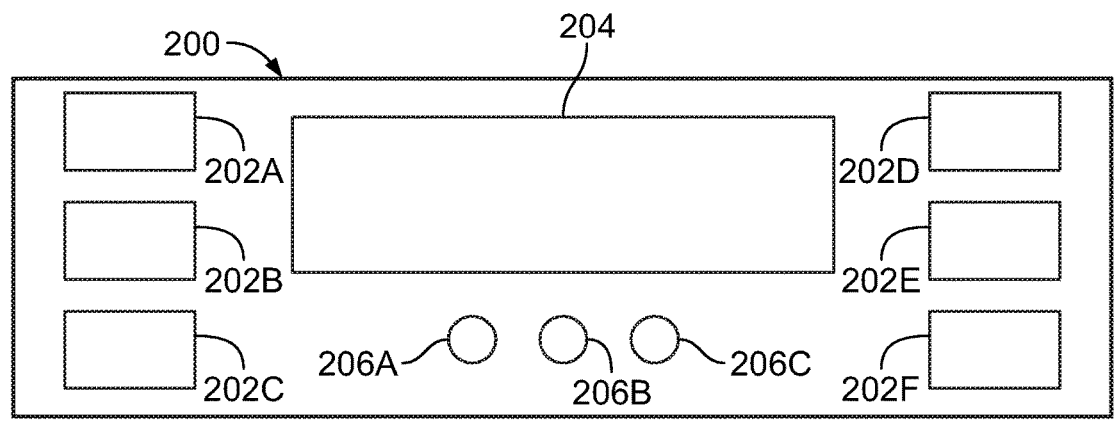
FIG. 2 illustrates a user interface of a device, in accordance with an example implementation.

FIG. 2 illustrates a user interface 200 of the device 104, in accordance with an example implementation. The user interface 200 may include a plurality of user interface items. For instance, the user interface 200 may include user-selectable buttons 202A, 202B, 202C, 202D, 202E, and 202F. These buttons may be mechanically actuatable, or may be on-screen touch buttons. The user interface 200 may also include a display 204 configured to display messages and accept inputs from a user. The user interface 200 may also include indicators 206A, 206B, and 206C. Each of these indicators may, for example, emit light of a particular color to indicate a particular status of the cutting tool 102 or the device 104. These user interface items are examples for illustration only, and other user interface items and configurations are possible.

Figure 3:
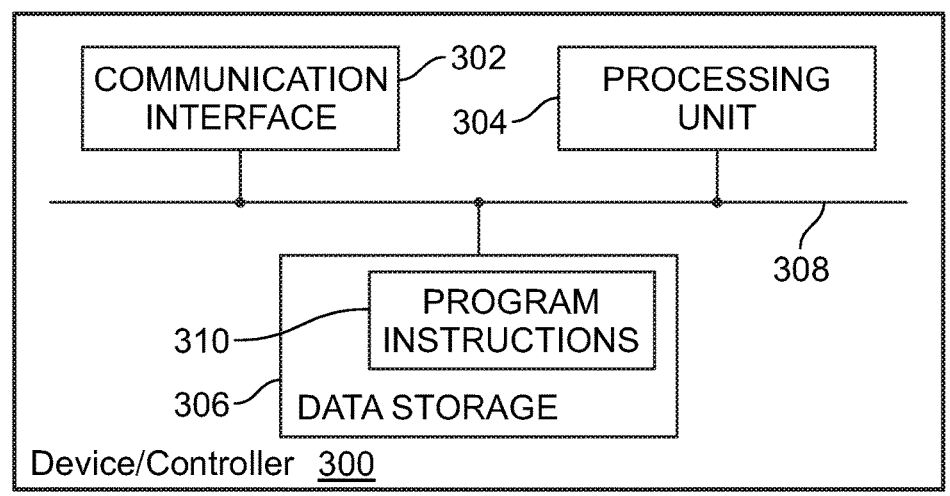
FIG. 3 illustrates a simplified block diagram of a controller or a device, in accordance with an example implementation.

FIG. 3 is a simplified block diagram of a controller or a device, in accordance with an example implementation. FIG. 3 shows some of the components that may be included in the device 104 or the controller of the cutting tool 102 to facilitate carrying out operations described herein.

As shown in FIG. 3, the device includes a communication interface 302, a processing unit 304, and non-transitory data storage 306, all of which may be communicatively linked together by a system bus, network, or other connection mechanism 308. Further, although these components are shown as discrete blocks in the figure, the components could be integrated together in various ways and/or distributed, replicated, or arranged in some other manner.

The communication interface 302 may operate to facilitate communication with various other entities. For instance, if the device 300 represents the device 104, then the communication interface 302 facilitates transmitting signals/messages from the device 104 to the cutting tool 102 and receiving signals/messages from the cutting tool 102. Similarly, if the device 300 represents the controller of the cutting tool 102, then the communication interface 302 facilitates transmitting signals/messages from the controller to the device 104 and receiving signals/messages from the device 104.

As such, the communication interface 302 may include one or more network communication interface modules, such as Ethernet network communication interface modules for instance, or may take any of a variety of other forms, supporting wireless and/or wired communication according to any of a variety of network communication protocols such as Bluetooth, Near Field Communication (NFC), etc. Further, the device 300 may include one or more antennae to facilitate communication with other devices.

Processing unit 304 may include one or more general purpose processors (such as microprocessors) and/or one or more special purpose processors (e.g., application specific integrated circuits). The data storage 306 may comprise one or more volatile and/or non-volatile storage components, such as optical, magnetic, or flash storage. As shown, the data storage 306 may hold program instructions 310 that are executable by processing unit 304 to carry out various operations described herein.

The cutting tool 102 may be configured to operate in at least two operating modes: a normal mode and a remote-cut mode. In the normal mode, an operator may place a cable between the blades 108 and pull the trigger 110 causing the actuator to move the blades 108 relative to each other and cut the cable. As long as the operator is pulling the trigger 110, the actuation mechanism is powered, e.g., power is provided to the motor that controls motion of the actuator. But, as the operator releases the trigger 110, power is disconnected from the actuation mechanism. Thus, this normal mode of operation may be safe if the cable is not energized as the operator stays close to the cutting tool 102, possibly holding the cutting tool 102, while the cutting operation is being performed.

In the remote-cut mode, however, the cutting tool 102 may be remotely controlled via the device 104. The cutting tool 102 may be in wireless communication with the device 104. Thus, the cutting tool 102 and the device the device 104 may exchanges signals and messages associated with performance of a cutting operation. Particularly, the device 104 may be used to remotely control the cutting tool 102 to perform a cutting operation while an operator is away from the cutting tool 102.

Figure 4A:
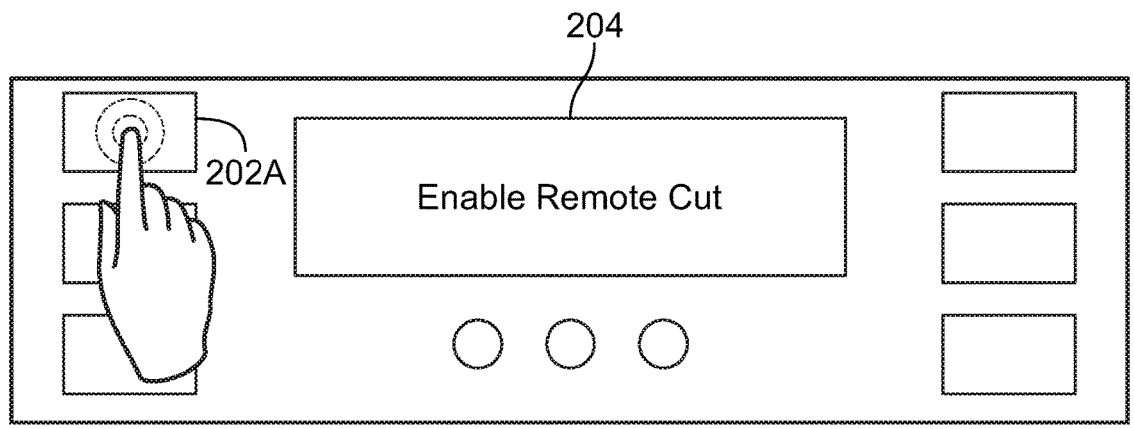
FIGS. 4A, 4B, 4C, 4D, 4E, 4F, 4G and 4H illustrate procedure for enabling remote-cut mode, in accordance with an example implementation.

A first step associated with the remote-cut mode may involve verifying that a user or operator wants to start a remote-cut operation. FIGS. 4A-4H illustrate procedure for enabling remote-cut mode, in accordance with an example implementation. As shown in FIG. 4A, an operator may press the button 202A of the device 104 to initiate enabling the remote-cut mode. In response, a processor of the device 104 may generate a display of a message, e.g., "Enable Remote Cut," on the display 204 to alert the operator that the 202A button has been pressed or selected.

Figure 4B:
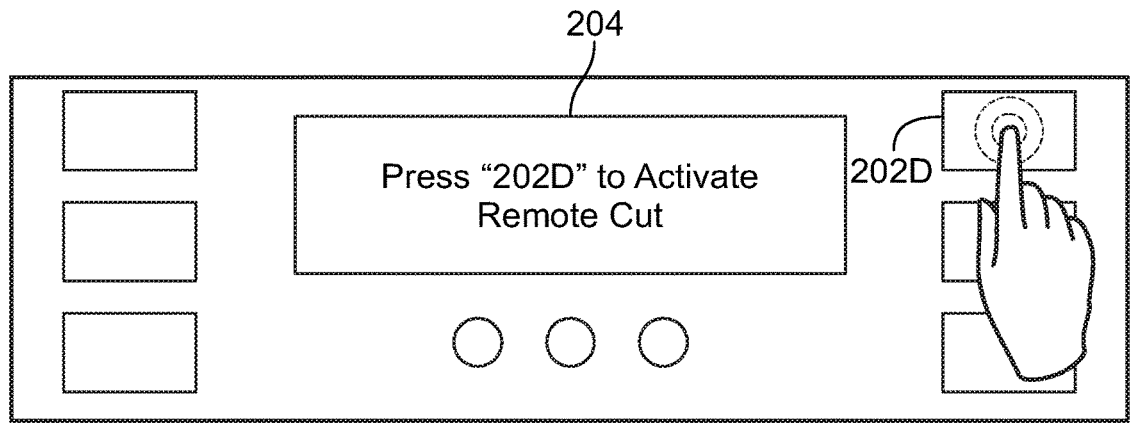

To ensure that the button 202A has been pressed intentionally, the device 104 may request a confirmation from the operator. As such, the device 104 may prompt the operator for a second enable criterion in addition to pressing the button 202A. For instance, a display of a message, e.g., "Press '202D' to Activate Remote Cut," may be generated on the display 204 as shown in FIG. 4B. The operator may then press the button 202D to confirm that the operate intended to enable the remote-cut mode. Additionally, the device 104 may also determine an amount of time that elapsed between pressing the button 202A and pressing the button 202D. If the amount of time is less than a threshold period of time, e.g., 10 seconds, then the device 104 determines that the operator intends to initiate the remote-cut mode. If the period of time exceeds the threshold period of time, then the device 104 discards the previous pressing or selection of the button 202A, and does not initiate enabling the remote-cut mode.

Figure 4C:
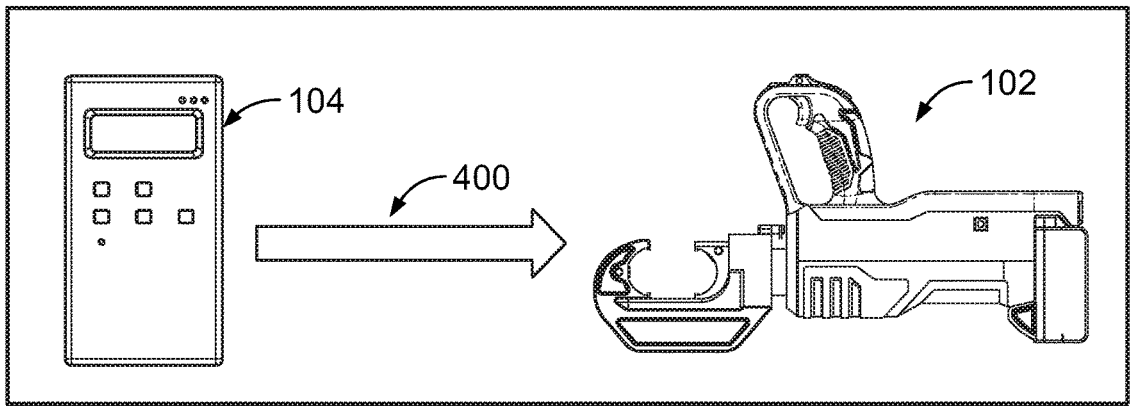

Assuming that the button 202D was pressed within the threshold amount of time, the device 104 verifies the operator's intention to initiate the remote-cut mode. In response, the device 104 may then transmit or send a signal 400 to the cutting tool 102, as shown in FIG. 4C, to command the controller of the cutting tool 102 to prepare for a remote-cut operation.

Figure 4D:
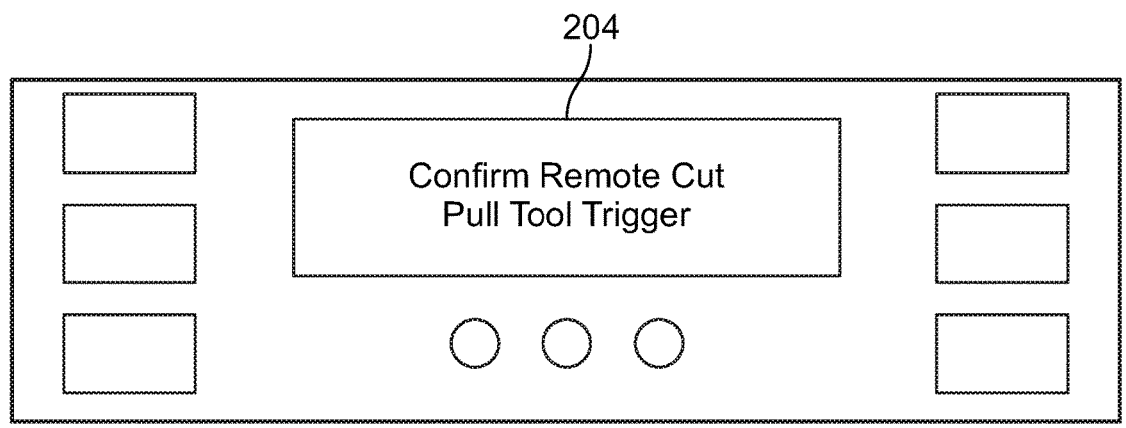
Figure 4E:
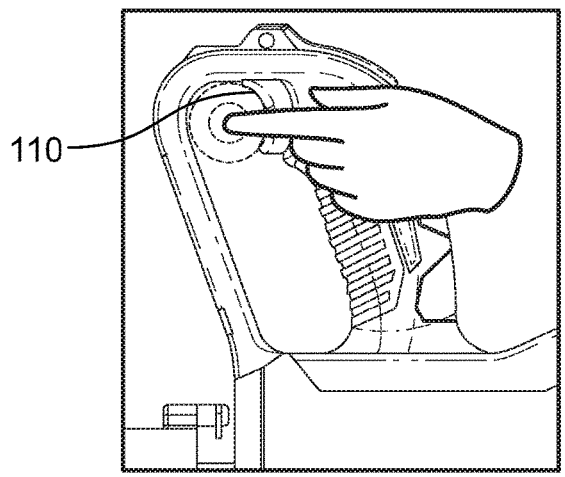
Figure 4F:
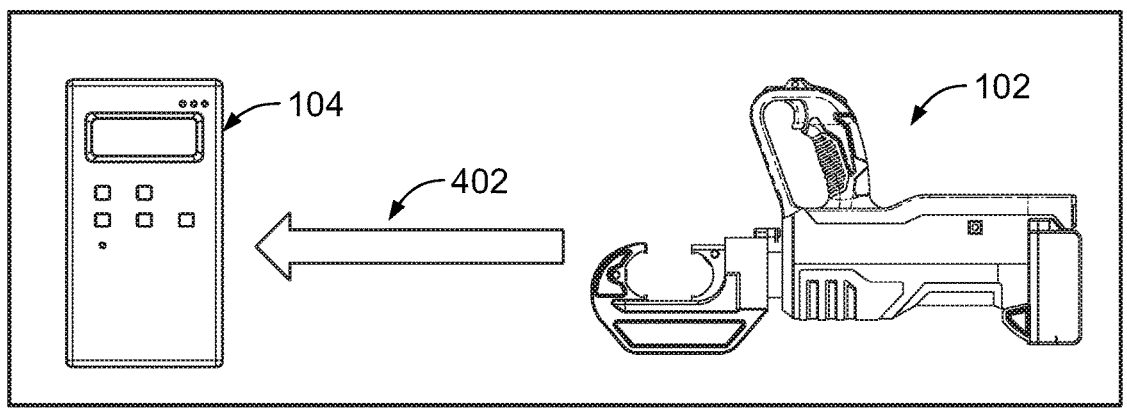
Figure 4G:
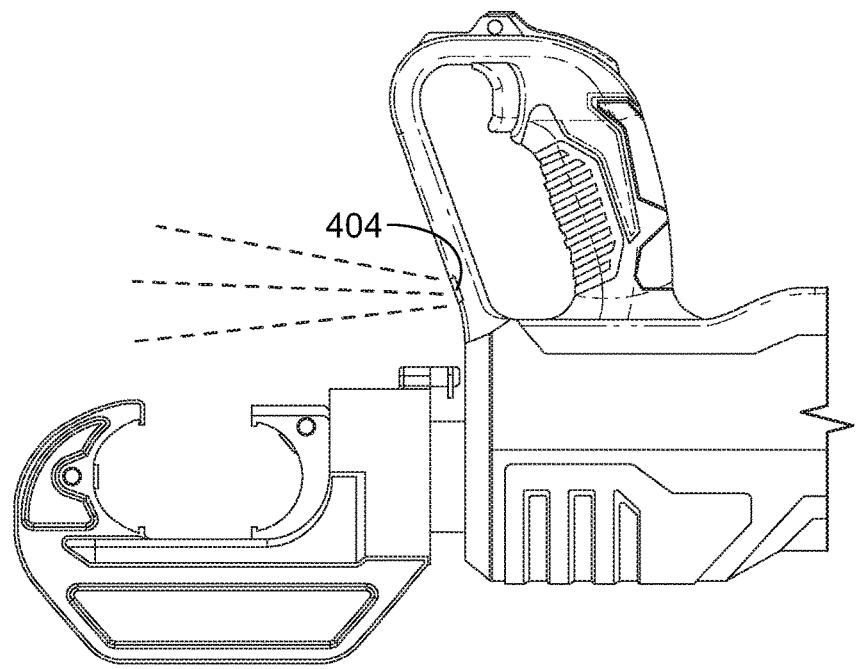

Further, as shown in FIG. 4D, the device 104 may request a third enable criterion from the operator. Particularly, a display of a message, e.g., "Confirm Remote Cut Pull Tool Trigger," may be generated on the display 204 to prompt the operator to actuate or pull the trigger 110 as shown in FIG. 4E. If the operator pulls the trigger 110, the controller of the cutting tool 102 may send a signal/message 402 to the device 104 to confirm that the trigger 110 has been pulled and that the cutting tool 102 is in the remote-cut mode, as shown in FIG. 4F. The exchange of signals between the cutting tool 102 and the device 104 further serves to verify that communication therebetween is established.

It should be noted that if the cutting tool 102 is in the normal mode of operation, pulling the trigger 110 may cause the actuator of the cutting tool 102 to be powered and the blades 108 to move relative to each other. However, because the cutting tool 102 had received the signal 400 from the device 104 that commands the cutting tool 102 to prepare for the remote-cut mode, pulling the trigger 110 in FIG. 4E does not cause the actuator to be powered. If the signal 400 was not received correctly at the cutting tool 102 due to, for example, communication faults, pulling the trigger 110 might cause the actuator to be powered. This indicates to the operator that communication has not been established or that the procedure for enabling the remote-cut mode might not have been followed correctly.

In addition to sending the signal 402 to the device 104, the cutting tool 102 may provide an indication to the operator that the cutting tool 102 is now in the remote-cut mode (e.g., the cutting tool 102 switched from a normal mode of operation to the remote-cut mode of operation). For instance, the cutting tool 102 may have a light emitting diode (LED) indicator 404 shown in FIG. 4G. The controller of the cutting tool 102 may cause the LED indicator 404 to flash or emit light intermittently at a particular frequency (e.g., 2 flashes/second) to notify the operator that the remote-cut mode is enabled.

In an example, the controller may further start a timer upon sending the message 402 to the device 104. If a threshold period of time (e.g., 2 minutes) lapses from the start of the timer without receiving further communications from the device 104, the controller may cause the cutting tool 102 to disable or exit the remote-cut mode and switch back to the normal mode of operation.

Figure 4H:
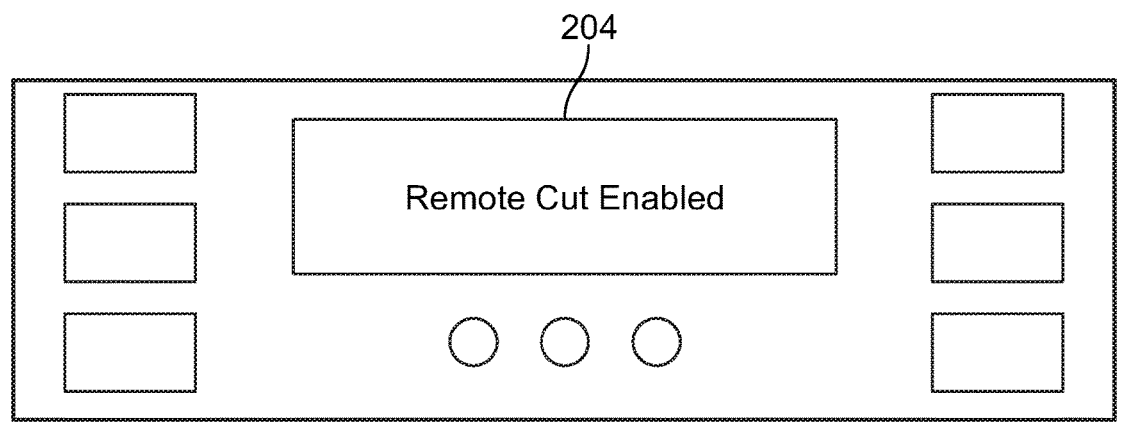

Upon receiving the signal 402 at the device 104, a display of a message, e.g., "Remote Cut Enabled" as shown in FIG. 4H, may be generated on the display 204 to further confirm to the operator that the remote-cut mode is enabled.

Now that the remote-cut mode is enabled, the operator may next prepare the cut location at the cutting tool 102. For instance, the operator may place a cable between the blades 108. Flashing of the LED indicator 404 indicates to the operator that the cutting tool 102 is still in the remote-cut model.

Figure 5A:
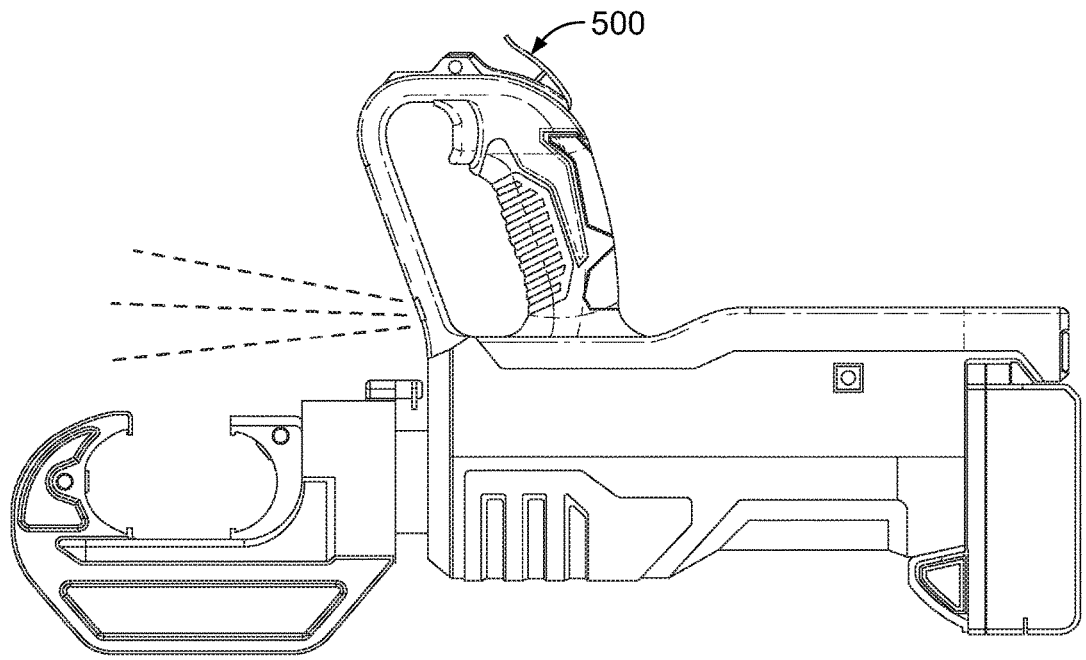
FIGS. 5A, 5B, 5C, and 5D illustrate procedure for arming a cutting tool, in accordance with an example implementation.

A second step associated with the remote-cut mode may involve arming or readying the cutting tool 102 before the operator exits the cut location to avoid any hazards. FIGS. 5A-5D illustrate procedure for arming the cutting tool 102, in accordance with an example implementation. As shown in FIG. 5A, the cutting tool 102 may further include a trigger lock 500. If the trigger 110 is pulled, and then the trigger lock 500 is actuated, e.g., pressed down, then the trigger 110 is locked in an "on" state. The "on" state of the trigger 110 could also be referred to as an "active" or "enabled" state. This process may require both hands of the operator: one hand to pull the trigger 110, and a second hand to actuate the trigger lock 500. This is a safety precaution as the operator cannot lock the trigger 110 in the "on" state accidently by one hand.

Figure 5B:
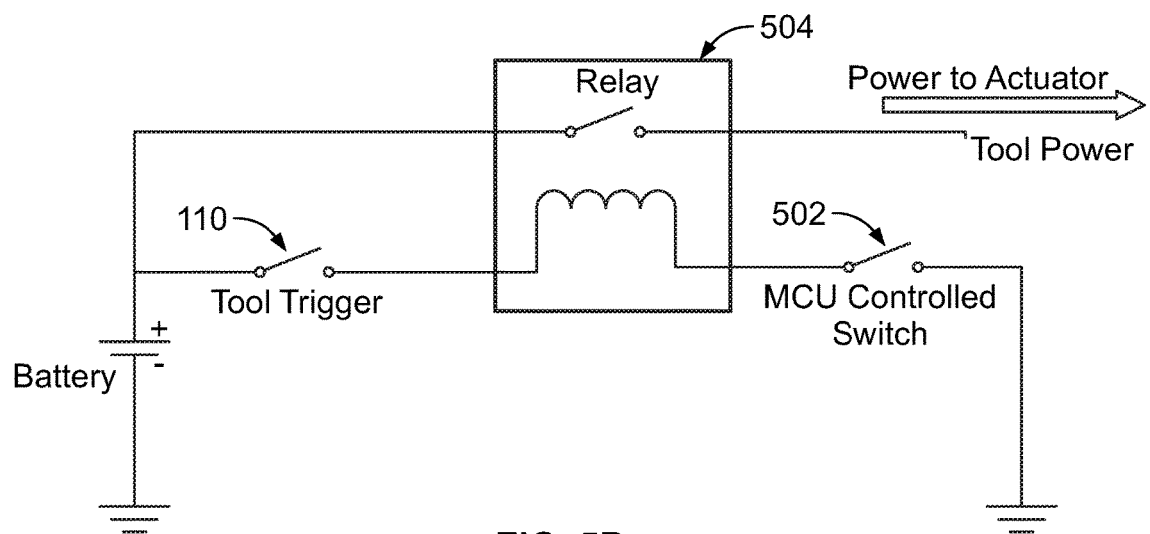

FIG. 5B illustrates a simplified electric circuit for the cutting tool 102, in accordance with an example implementation. A switch 502 is controlled by a main control unit (MCU), i.e., the controller of the cutting tool 102. As shown by the electric circuit, both the trigger 110 and the switch 502 need to be activated for a relay 504 to be energized, and thus deliver power to the actuator of the cutting tool 102.

Thus, to operate the cutting tool 102 remotely, the trigger 110 has to stay in the "on" state, i.e., stayed pulled. In this manner, when the controller activates or turns on the switch 502, power would be delivered to the actuator, thus causing the cutting tool 102 to perform a cutting operation. When the trigger lock 500 is pushed by the operator while the trigger 110 is pulled, the trigger lock 500 mechanically locks the trigger 110 in the "on" state. In this case, the cutting tool 102 is armed, such that when the controller turns on the switch 502, power is delivered to the actuator of the cutting tool 102.

In an example, the controller of the cutting tool 102 may start a timer when the trigger 110 is locked in the "on" state by the trigger lock 500. If the trigger 110 or the trigger lock 500 remains depressed for a threshold period of time (e.g., 20 seconds), the controller confirms that the operator intends to arm the cutting tool 110. The operator can disarm the cutting tool 110 with one hand by disengaging the trigger lock 500.

Figure 5C:
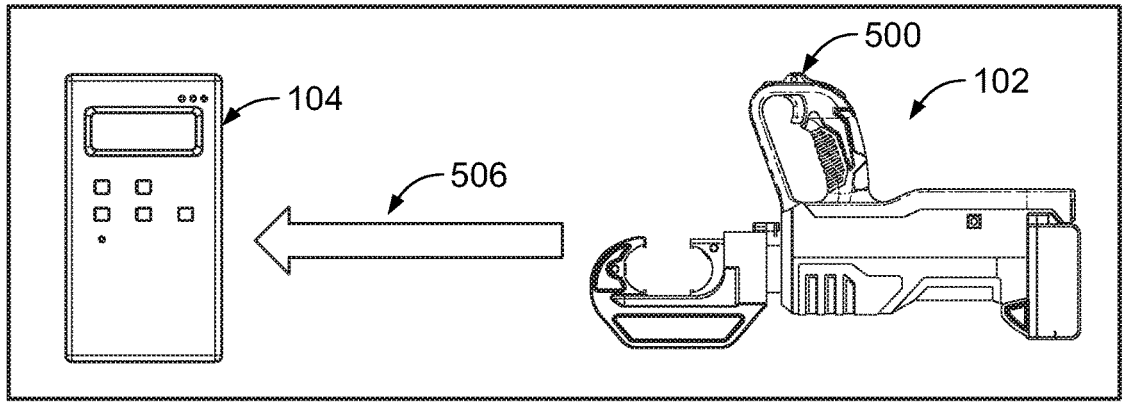
Figure 5D:
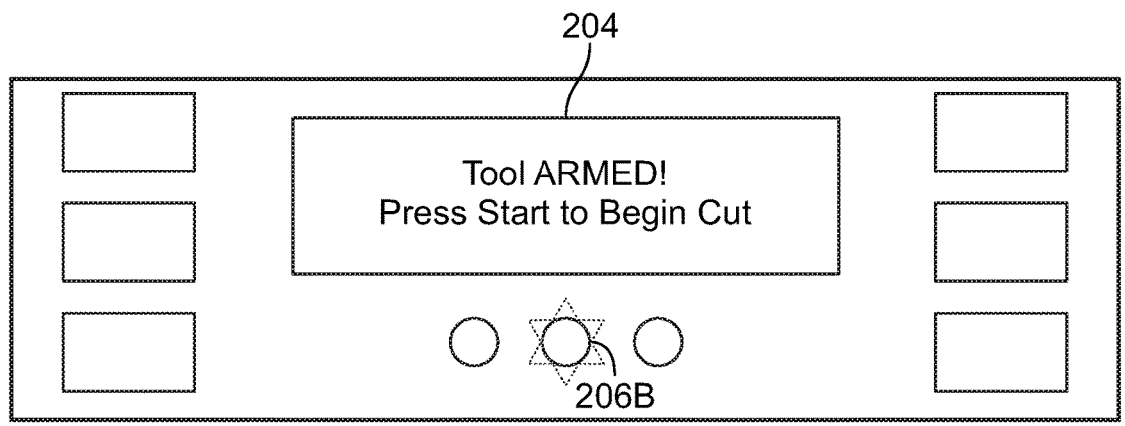

When the controller confirms that the operator intends the cutting tool 102 to be armed, the controller sends a signal 506, as shown in FIG. 5C, to the device 104 to inform the device 104 that the trigger 110 is held in the "on" state and the cutting tool 102 is armed. In response, a display of a message, e.g., "Tool Armed! Press Start to Begin Cut," may be generated on the display 204. Further, the device 104 may cause one of the indicators, such as the light indicator 206B, as shown in FIG. 5D, to flash with a particular color (e.g., red) to further indicate to the operator that the cutting tool 102 is armed and ready to perform a cutting operation.

In an example, the controller of the cutting tool 102 may start a timer when the cutting tool 102 is armed. If controller does not receive an indication from the device 104 to start a cutting operation within a threshold period of time (e.g., 2 minutes), the controller may disarm the cutting tool 102. The cutting tool 102 may then stay in the remote-cut mode and wait for a re-arming procedure, or the controller may cause the cutting too to revert back to the normal operating mode.

A third step associated with the remote-cut mode may involve starting the cutting operation. Now that the cutting tool 102 is armed and ready to perform the cutting operation, the operator exits or has already exited the cutting location to avoid any hazards. The operator can control the cutting tool remotely via the device 104.

FIGS. 6A-6G illustrate procedure for performing a remote cutting operation, in accordance with an example implementation. To confirm that the operator intends to command the cutting tool 102 to cut a cable placed between the blades 108, the operator may be required to press and hold one or more buttons for a particular period of time (e.g., 3 seconds).

Figure 6A:
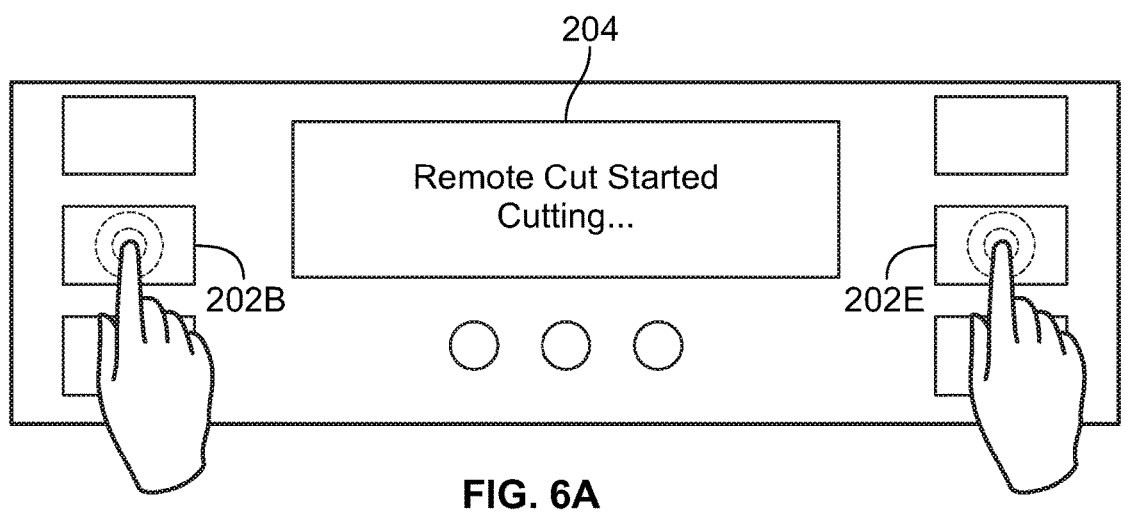
FIGS. 6A, 6B, 6C, 6D, 6E, 6F, and 6G illustrate procedure for performing a remote cutting operation, in accordance with an example implementation.

FIG. 6A illustrates an operator pressing the buttons 202B and 202E to starting the cutting operation remotely. The buttons 202B and 202E are placed on the user interface 200 of the device 104 so as to ensure that the operator uses both hands to command starting the cutting operation, which further confirms the operator's intention. The buttons 202B and 202E may be pressed at substantially the same time (e.g., the operator may begin pressing the button 202B and then within a threshold period of time, such as 100 milli seconds, begins pressing the other button 202E). Requiring the operator to use both hands to send the cutting command further ensures that the operator's hands are away from the cutting tool 102 and thus further enhances operator safety.

Figure 6B:
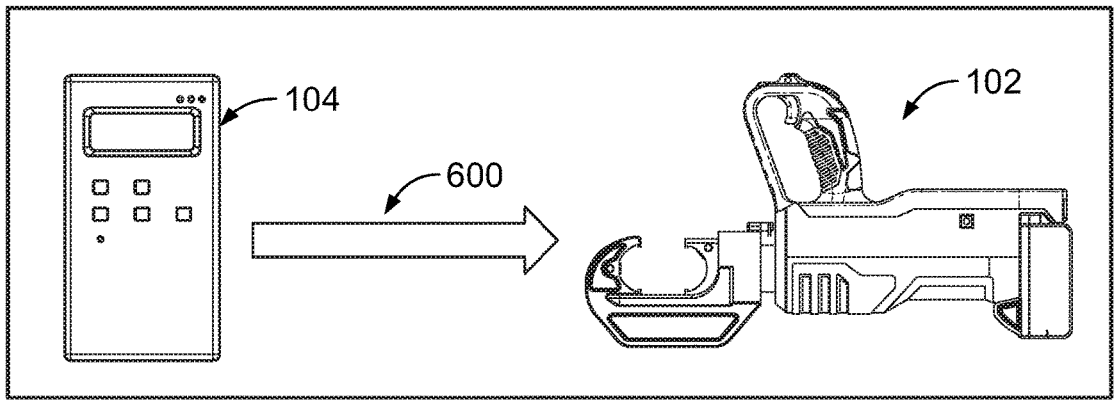

If the device 104 confirms that the operator intends to start the cutting operation by pressing both buttons 202B and 202E substantially simultaneously for a particular period of time, the device 104 sends a signal 600, as shown in FIG. 6B, to the cutting tool 102. In response to receiving the signal 600, the controller of the cutting tool 102 may turn on the switch 502 to start the cutting operation. A display of a message, e.g., "Remote Cut Starting—Cutting" may be generated on the display 204 of the device 104, as shown in FIG. 6A, to show the operator that the cutting operation started or is about to start.

In some examples, the operator may desire to stop the cutting operation before completion. For instance, a tool failure may occur, the cable may be displaced while the operation is performed, or any other event might occur that would prompt the operator to stop the ongoing cutting operation.

Figure 6C:
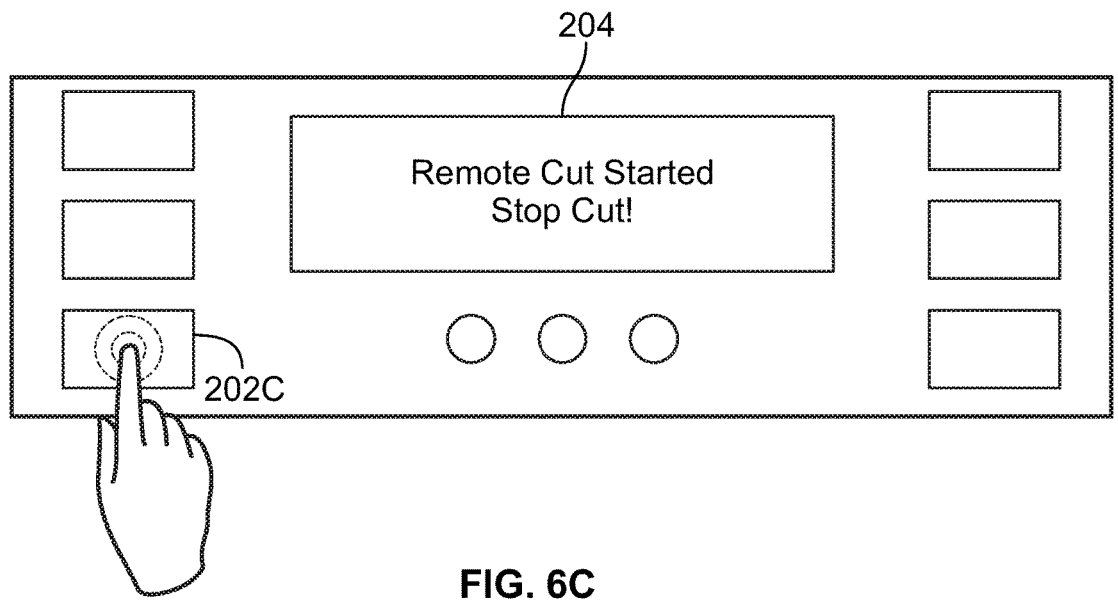
Figure 6D:
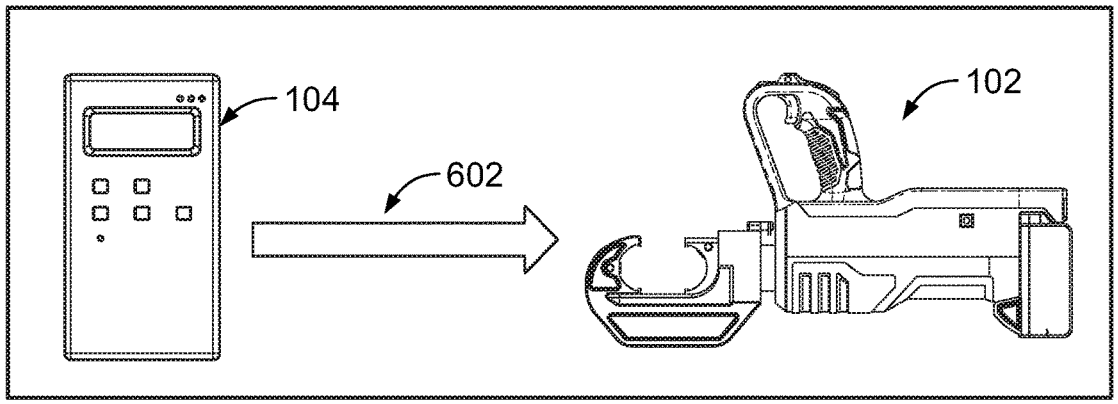

As shown in FIG. 6C, the operator may press the button 202C to indicate the operator's request to stop the cutting operation. In response, a display of a message, such as "Remote Cut Started—Stop Cut," may be generated on the display 204 as shown in FIG. 6C, to indicate the operator's request. Further, the device 104 may send a signal 602, as shown in FIG. 6D, to the cutting tool 102 commanding the controller of the cutting tool 102 to stop the cutting operation. All or a subset of the steps described above may have to be repeated to restart a remote cutting operation.

Additionally, the cutting tool 102 and the device 104 may provide the operator with a status of a cutting operation. The controller of the cutting tool 102 may receive information indicating that a cutting operation has been performed successfully. For instance, a hydraulic pressure within the cutting tool 102 may reach a threshold or target pressure value indicating that the actuator reached a limit of its travel stroke and thus the cut was successfully performed. As another example, the actuator may have a position sensor that might indicate to the controller that the actuator reached the end of its travel stroke. Other indicators are also possible.

On the other hand, the controller may also determine that a failure occurred during the cutting operation. For instance, the controller may determine or receive sensor information indicating that the actuator has stalled or that the battery 112 is overloaded, or any other event that might indicate fault with the cutting tool 102.

Figure 6E:
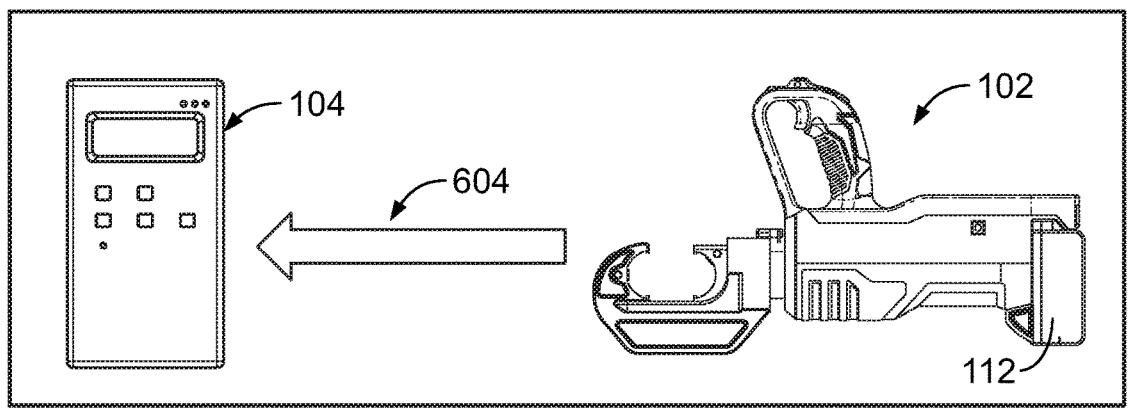
Figure 6F:
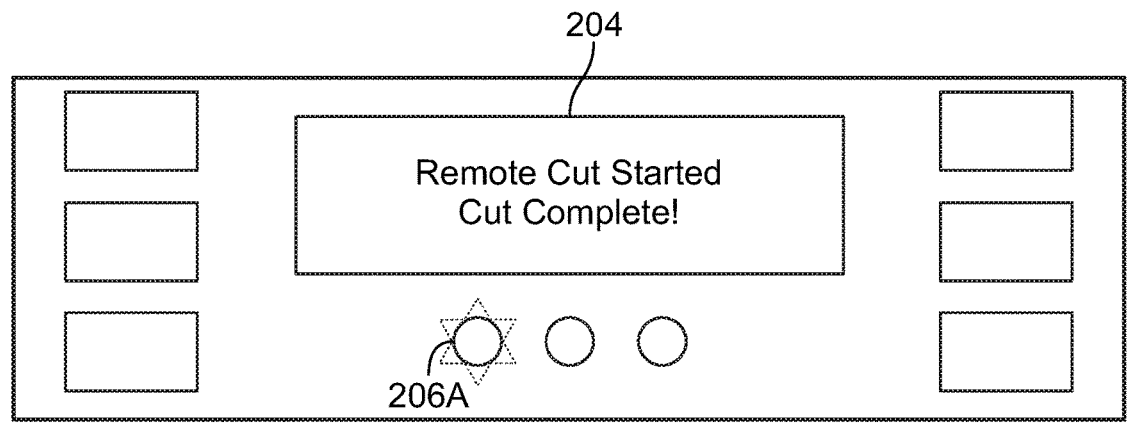

Whether the cutting operation is successful or an error has occurred, the controller of the cutting tool 102 may send a signal 604, as shown in FIG. 6E, to the device 104 to indicate the status of the cutting operation. When the device 104 receives the signal 604, the device 104 may provide indications to the operator regarding the status of the cutting operation. For instance, if the cutting operation has been successful, a display of a message "Cut Complete!" may be generated on the display 204 as shown in FIG. 6F. Further, the light indicator 206A may flash at a particular frequency with a green light to indicate success of the cutting operation.

Figure 6G:
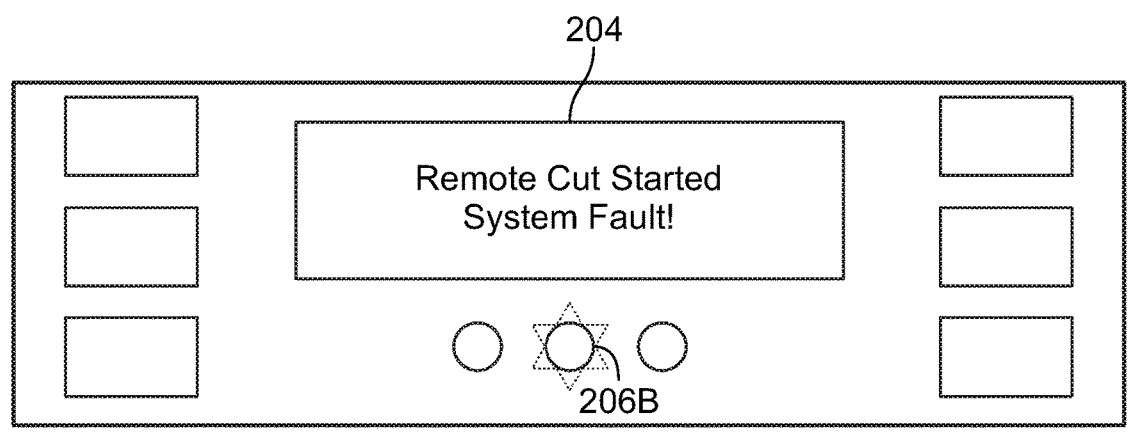

On the other hand, if a fault has occurred and the cutting operation has been stopped, a display of a message "System Fault!" may be generated on the display 204, as shown in FIG. 6G. Further, the light indicator 206B may flash at a particular frequency with a red light to indicate system fault or failure of the cutting operation.

Upon completion of the cutting operation, the controller of the cutting tool 102 may cause the cutting tool 102 to switch back to the normal mode of operation. As mentioned above, in the normal mode of operation, if the operator pulls the trigger 110, the actuator of the cutting tool 102 would be powered.

To enhance safety of the system described above, it is desirable to ensure exclusive one-to-one pairing between the device 104 and the cutting tool 102. In other words, the cutting tool 102 may be configured to respond only to signals received from the device 104, and thus not respond to signals from any other devices. Similarly, the device 104 may be configured to communicate exclusively with the cutting tool 102. In this manner, unintended signals from other devices would not interfere with operation of the cutting tool 102 and the device 104.

Figure 7:
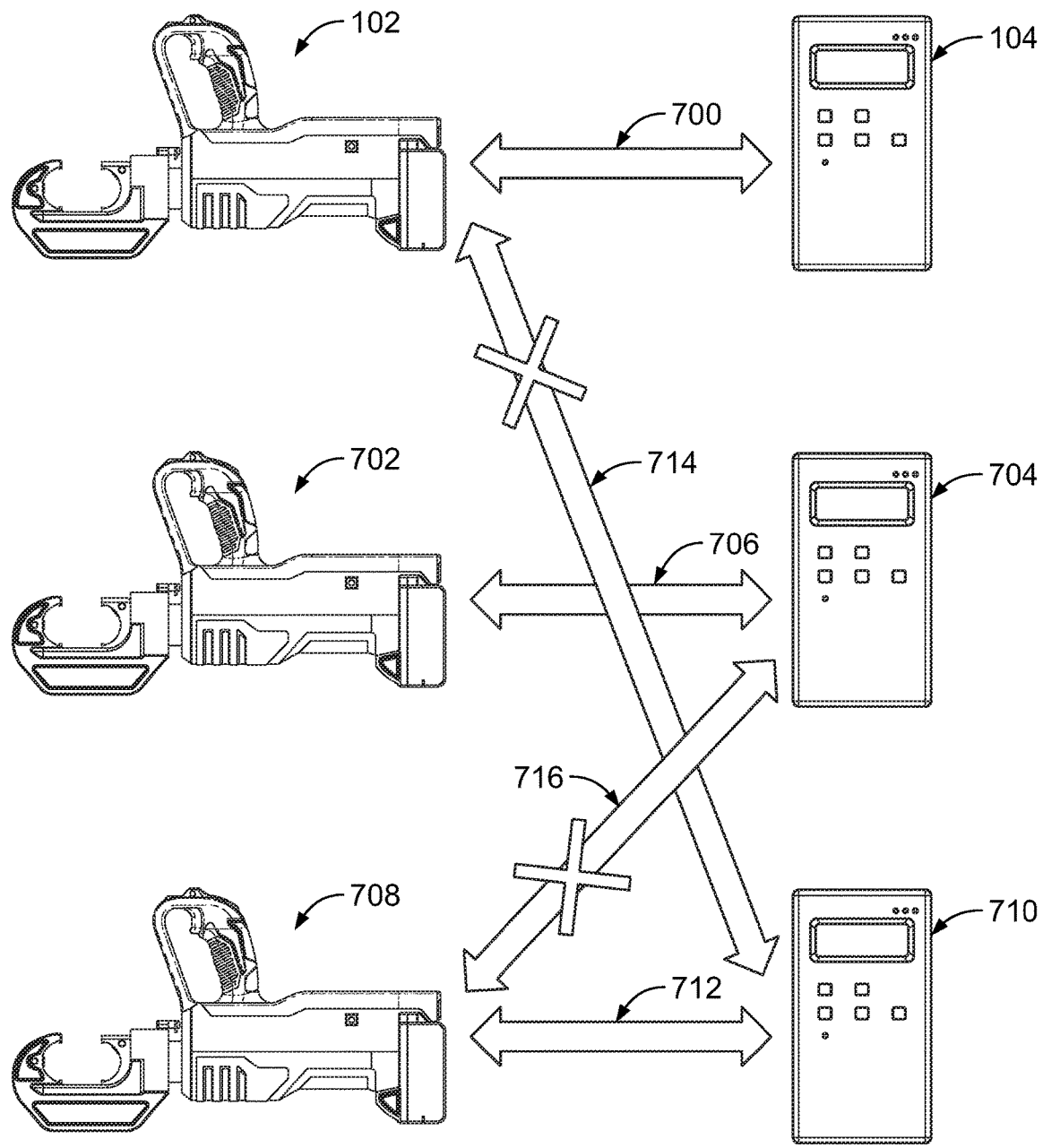
FIG. 7 illustrates exclusive one-to-one pairing between a cutting tool and a device, in accordance with an example implementation.

FIG. 7 illustrates exclusive one-to-one pairing between the cutting tool 102 and the device 104, in accordance with an example implementation. As shown in FIG. 7, the cutting tool 102 has exclusive one-to-one pairing with the device 104 via a communication channel 700. Similarly, a cutting tool 702 has exclusive one-to-one pairing with a device 704 via a communication channel 706, and a cutting tool 708 has exclusive one-to-one pairing with a device 710 via a communication channel 712. However, communication channels 714 and 716 are not available. As such, the cutting tool 102 cannot communicate with either the device 704 or 710. Similarly, there are no communication channels between the device 104 and either of the cutting tools 702 or 708. In this manner, no unintended communications or interference can occur between unpaired cutting tools and devices, and thus system's safety is enhanced.

In an example, to ensure exclusive one-to-one pairing between the cutting tool 102 and the device 104, the cutting tool 102 may be assigned a unique identifier, such as a particular communication address. Further, the device 104 may have a memory (e.g., the data storage 306) coupled to processor(s), and configured to store the unique identifier of the cutting tool 102. The device 104 may be configured to receive signals and communications in general only from a cutting tool having that stored unique identifier, i.e., the cutting tool 102. An example unique identifier may in a communication address such as a media access control (MAC) address.

Figure 8:
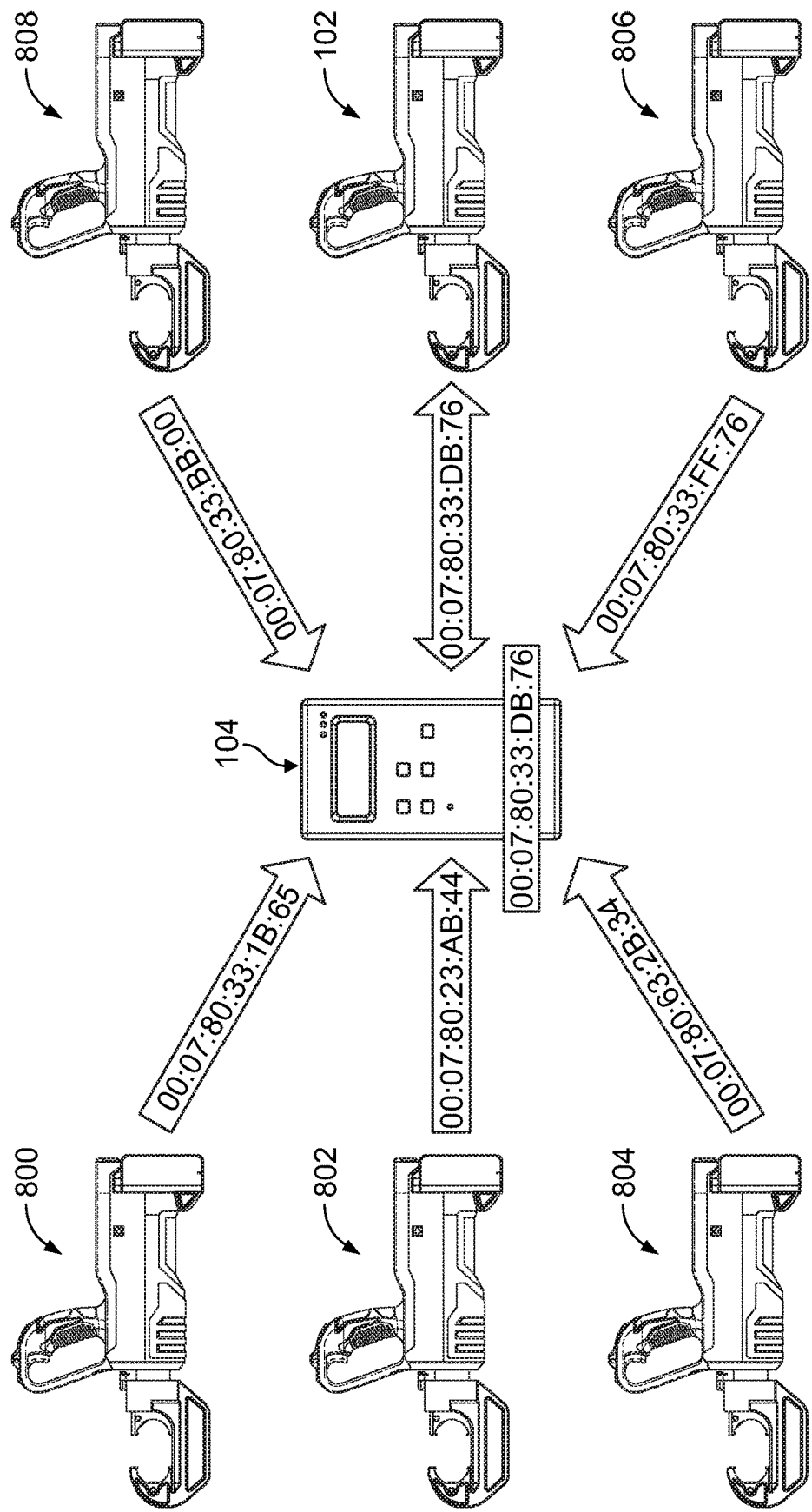
FIG. 8 illustrates a device communicating exclusively with a cutting tool, in accordance with an example implementation.

FIG. 8 illustrates the device 104 communicating exclusively with the cutting tool 102, which has a particular MAC address, in accordance with an example implementation. As shown in FIG. 8, the cutting tool 102 has a MAC address of (00:07:80:33:DB:76), which is stored in a memory of the device 104. Thus, the device 104 would exclusively receive and transmit communications to and from the cutting tool 102.

Other cutting tools are assigned different MAC addresses. Particularly, a cutting tool 800 is assigned a MAC address (00:07:80:33:1B:65); cutting tool 802 is assigned a MAC address (00:07:80:23:AB:44); cutting tool 804 is assigned a MAC address (00:07:80:63:2B:34); cutting tool 806 is assigned a MAC address (00:07:80:33:FF:76); and cutting tool 808 is assigned a MAC address (00:07:80:33:BB:00). The device 104 would not accept any communications from the cutting tools 800, 802, 804, 806, and 808 as their respective MAC addresses are not stored in the memory of the device 104.

Figure 9:
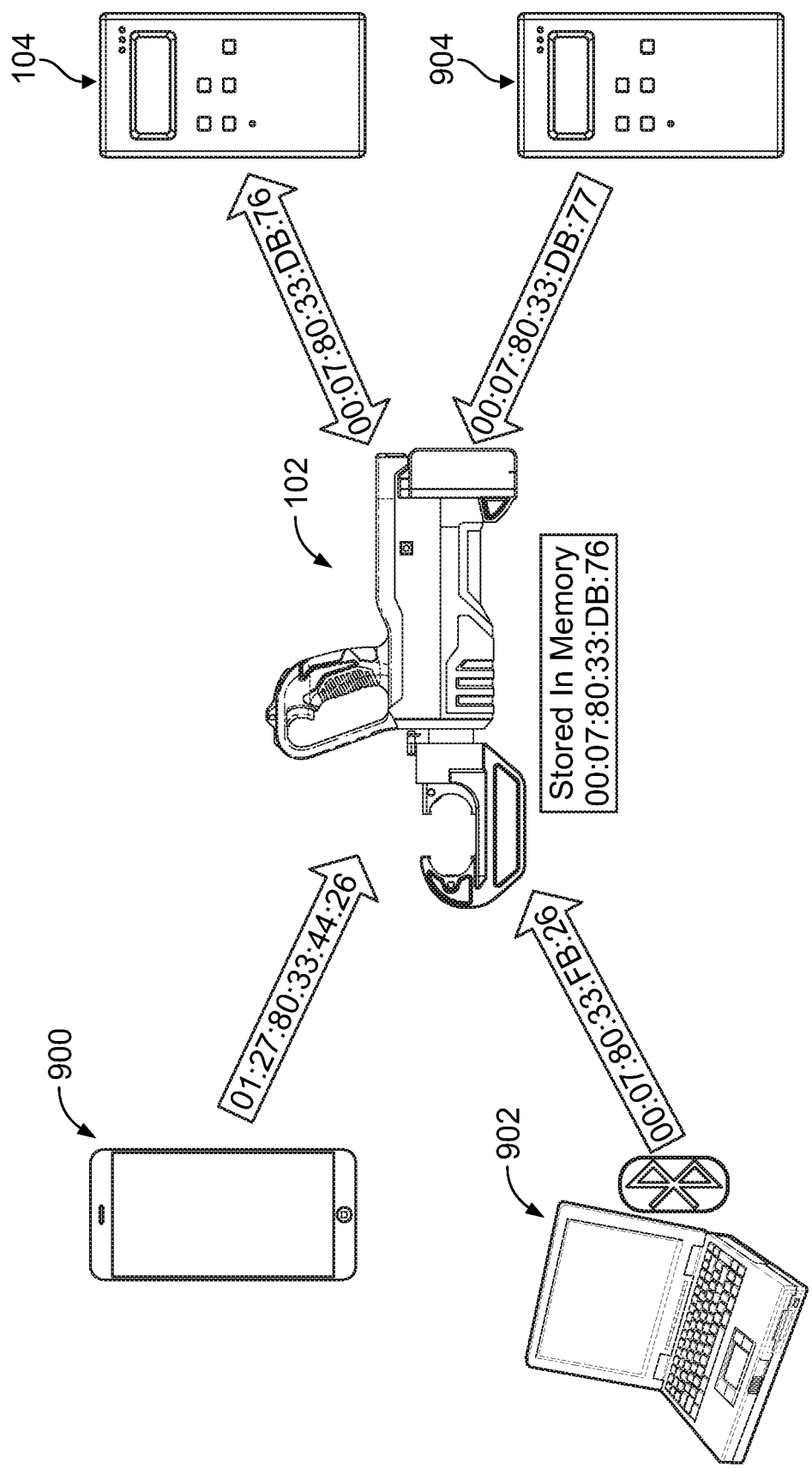
FIG. 9 illustrates a cutting tool communicating with a particular device while excluding other devices, in accordance with an example implementation.

FIG. 9 illustrates the cutting tool 102 communicating with the device 104 while excluding other devices, in accordance with an example implementation. The cutting tool 102 also has the same MAC address (00:07:80:33:DB:76) stored in its memory, and would pair only with the device 104, which is assigned the same MAC address. A device 900 is assigned a MAC address (01:27:80:33:44:26); device 902 is assigned a MAC address (00:07:80:33:FB:26); and device 904 is assigned a MAC address (00:07:80:33:DB:77). The cutting tool 102 would not accept any communications from the devices 900, 902, and 908 as their respective MAC addresses are not are not stored in the memory of the cutting tool 102.

III. EXAMPLE METHODS

Figure 10:
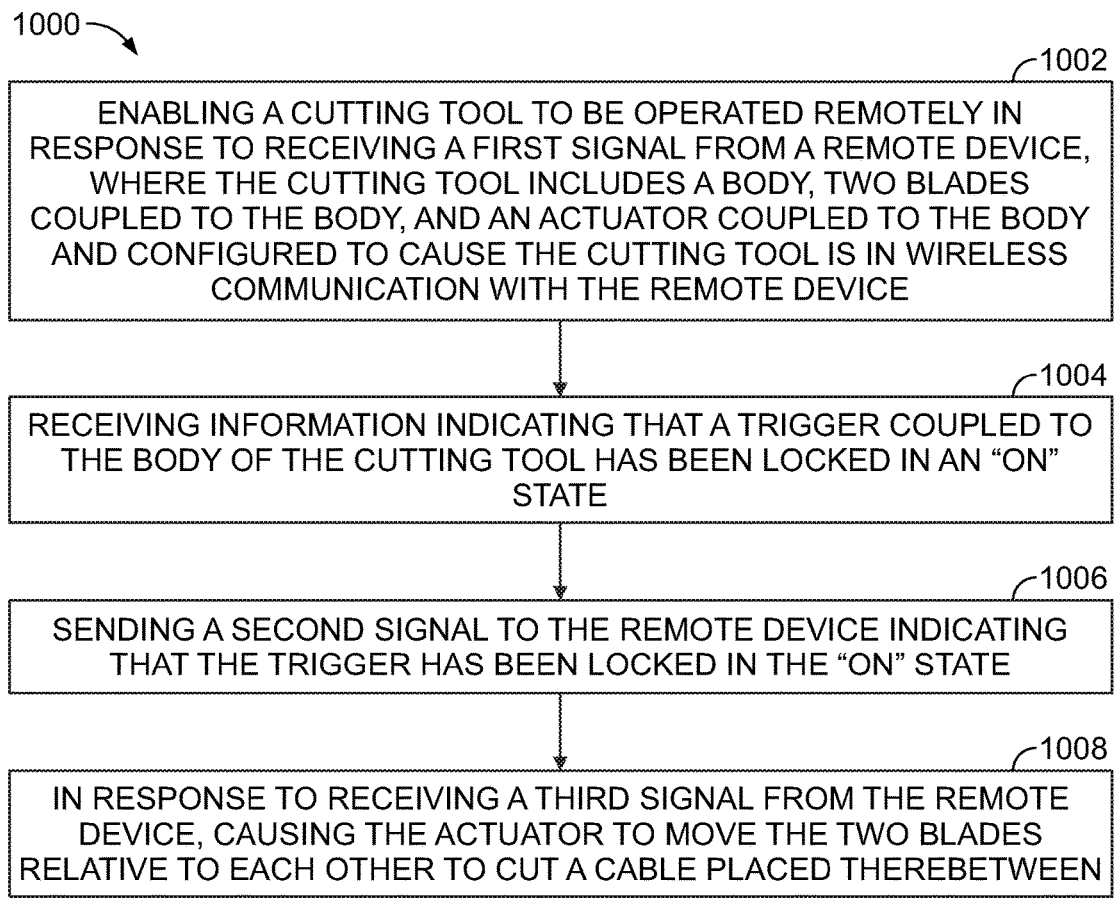
FIG. 10 is a flow chart, in accordance with an example implementation.

FIG. 10 is a flow chart 1000, in accordance with an example implementation. The flow chart 1000 may include one or more operations, or actions as illustrated by one or more of blocks 1002-1008. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 1000 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 1000 and other processes and operations disclosed herein, one or more blocks in FIG. 10 may represent circuitry or digital logic that is arranged to perform the specific logical operations in the process.

The operations of the flow chart 1000 may be implemented by, for example, the controller of the cutting tool 102 as described above.

At block 1002, the flow chart 1000 includes enabling a cutting tool to be operated remotely in response to receiving a first signal from a remote device. In line with the discussion above, a cutting tool (e.g., the cutting tool 102) includes a body, two blades coupled to the body, and an actuator coupled to the body and configured to cause the two blades to move relative to each other. The cutting tool is in wireless communication with a remote device (e.g., the device 104). For instance, the cutting tool, or a controller of the cutting tool, may be in communication via a wireless protocol such as Bluetooth with the remote device.

The cutting tool may be configured to operate in at least two operating modes: a normal mode and a remote-cut mode. In the normal mode, an operator may place a cable between the blades and pull a trigger causing the actuator to move the blades relative to each other and cut the cable. In the remote-cut mode, however, the cutting tool may be remotely controlled via the remote device.

The controller may enable the cutting tool to operate in the remote-cut mode in response to one or more signals from the device. For instance, an operator may press a button (e.g., the button 202A) of a user interface of the device to initiate operating the cutting tool remotely. This first press may be considered by the device as a first enabling criterion. The device may request or wait for a second press on a second button (e.g., the button 202D) within a threshold period of time from the first press to confirm that the operator intends to operate the cutting tool remotely. The second press is considered as a second enabling criterion. In response to both the first and second enabling criteria, the device may send a signal (e.g., the signal 400) to the cutting tool to inform the controller of the cutting tool to prepare for operating remotely.

To emphasize safety, the controller may not place the cutting tool in a remote-cut mode until the controller receives a third enabling criterion. For instance, the operator may be requested to press on a trigger (e.g., the trigger 110) coupled to the cutting tool to confirm the operator's intention to operate the cutting tool remotely. Once the controller receives an indication of this third enabling criterion, the controller enables the cutting tool to operate in a remote-cut mode. The controller may further send a signal (e.g., the signal 402) to inform the device that the cutting tool is now operating in a remote-cut mode.

The cutting tool may further have a light indicator. The controller may cause the light indicator to flash at a particular frequency to alert the operator that the cutting tool is now operating in a remote-cut mode.

At block 1004, the flow chart 1000 includes receiving information indicating that a trigger coupled to the body of the cutting tool has been locked in an "on" state. After enabling the cutting tool to be operated remotely, the next step is to arm or ready the cutting tool to perform a cutting operation. As an example, the operator may lock the trigger in an "on" state to arm the cutting tool. For instance, the cutting tool may have a trigger locking mechanism (e.g., the trigger lock 500) that enables locking the trigger in the "on" state.

At block 1006, the flow chart 1000 includes sending a second signal to the remote device indicating that the trigger has been locked in the "on" state. The controller may receive an indication that the trigger is locked in the "on" state, and in response send a signal (the signal 506) to the remote device to inform it that the trigger has been locked in the "on" state. This signal further informs the remote device that the cutting tool is armed and ready to perform the cutting operation.

At block 1008, the flow chart 1000 includes, in response to receiving a third signal from the remote device, causing the actuator to move the two blades relative to each other to cut a cable placed therebetween. The operator may press one or more buttons (e.g., the buttons 202B and 202E) to starting the cutting operation. Responsively, the device sends a signal (e.g., the signal 600) to the cutting tool. When the controller of the cutting tool receives an indication of this signal. The controller commands the cutting tool to start the cutting operation. For instance, the controller provides power to an actuation mechanism that drives the actuator and causes the blades to move relative to each other and cut a cable placed therebetween.

Further, if the operator desires to stop the cutting operation for any reason, the operator may press a button (e.g., the button 202C) and the device may send another signal (e.g., the signal 602) to the cutting tool. The controller stops the cutting tool in response to receiving such signal. The controller may also send one or more signals during the cutting operation to inform the device, and thus the operator, about the status of the cutting operation, e.g., whether the cutting operation is successful or a fault has occurred.

Figure 11:
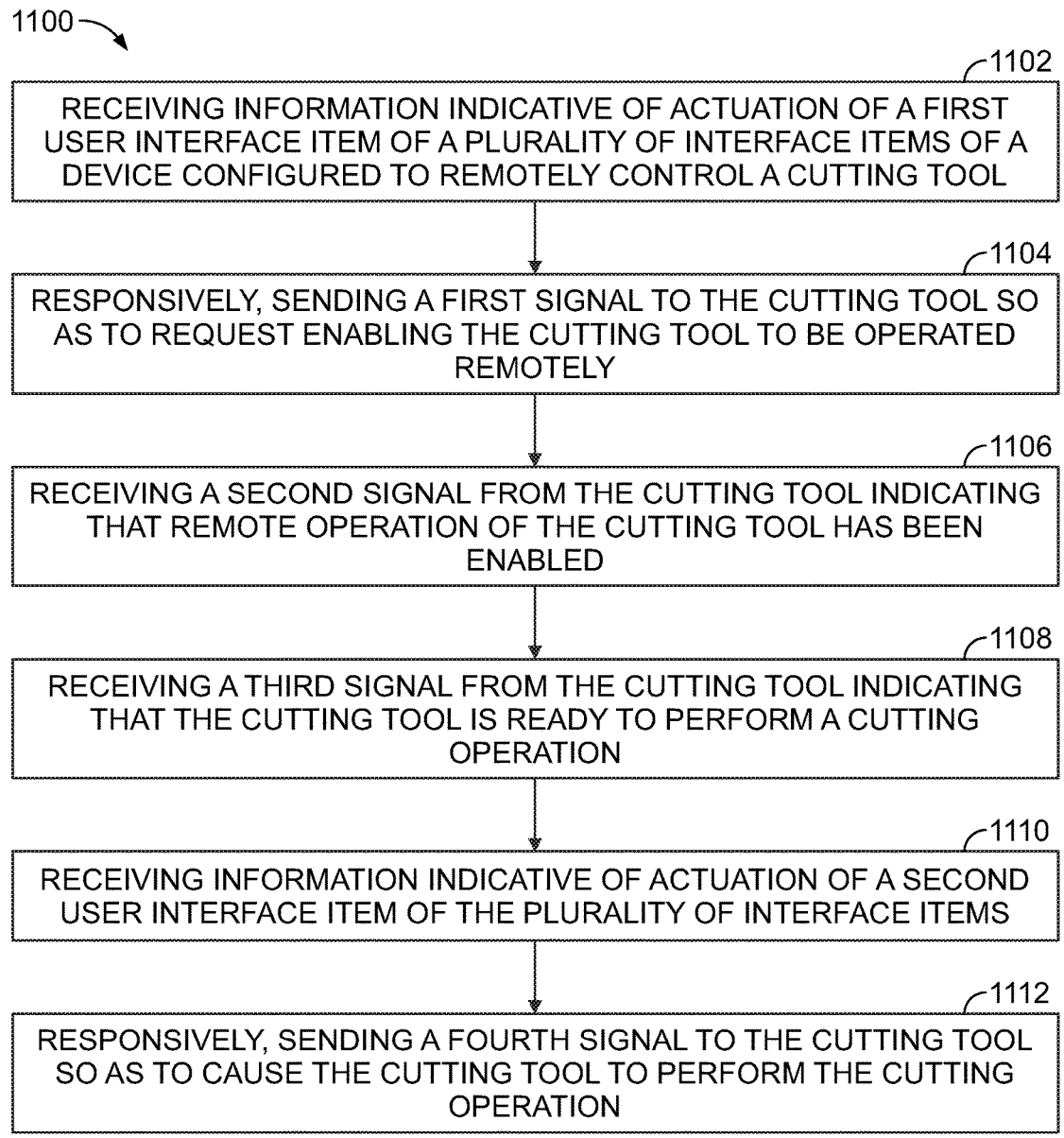
FIG. 11 is another flow chart, in accordance with an example implementation.

FIG. 11 is another flow chart 1100, in accordance with an example implementation. The flow chart 1100 may include one or more operations, or actions as illustrated by one or more of blocks 1102-1112. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 1100 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 1100 and other processes and operations disclosed herein, one or more blocks in FIG. 11 may represent circuitry or digital logic that is arranged to perform the specific logical operations in the process.

The operations of the flow chart 1100 may be implemented by, for example, the device 104 (or a processing unit of the device 104) as described above.

At block 1102, the flow chart 1100 includes receiving information indicative of actuation of a first user interface item of a plurality of interface items of a device configured to remotely control a cutting tool. A device such as the device 104 may have an interface (e.g., the user interface 200) having buttons, indicators, and a display. An operator may press one or more buttons (e.g., the buttons 202A and 202D) to activate a remote-cut mode of a cutting tool (e.g., the cutting tool 102). The processing unit of the device may then receive an indication that the operator pressed the buttons.

At block 1104, the flow chart 1100 includes responsively, sending a first signal to the cutting tool so as to request enabling the cutting tool to be operated remotely. In response to receiving the information indicating that the operator pressed the button(s), the device may then send a signal (e.g., the signal 400) to the cutting tool requesting that the cutting tool be enabled to be operated remotely.

At block 1106, the flow chart 1100 includes receiving a second signal from the cutting tool indicating that remote operation of the cutting tool has been enabled. After a controller of the cutting tool receives the first signal, the controller may further receive another indication or confirmation that the operator desires to operate the cutting tool in the remote-cut mode. The confirmation may include, for example, the operator pulling a trigger of the cutting tool. The controller then sends a second signal (e.g., the signal 402) to the device to confirm that the remote-cut mode has been enabled for the cutting tool. The processing unit of the device may generate a display of a message on a display of the device that the remote-cut mode is enabled.

At block 1108, the flow chart 1100 includes receiving a third signal from the cutting tool indicating that the cutting tool is ready to perform a cutting operation. After enabling the remote-cut model, the operator may arm or ready the cutting tool for a cutting operation. For instance, the operator may lock a trigger of the cutting tool in an "on" state. Then, the controller may send a signal (e.g., the signal 506) to inform the device that the cutting tool is armed and ready to perform the cutting operation. The processing unit of the device may generate a display of a message on a display of the device that the cutting tool is armed.

At block 1110, the flow chart 1100 includes receiving information indicative of actuation of a second user interface item of the plurality of interface items. Once the operator sees a message or is informed that the cutting tool is armed, the operator may select or actuate a user interface item (press the buttons 202B and 202E) to command starting the cutting operation. The processing unit of the device receives an indication that the operator selected the user interface item.

At block 1112, the flow chart 1100 includes, responsively, sending a fourth signal to the cutting tool so as to cause the cutting tool to perform the cutting operation. In response to receiving an indication that the operator commanded starting the cutting operation, the device sends a signal (e.g., the signal 600) commanding the cutting tool to starting the cutting operation. The device may thereafter receive signals from the cutting tool 102 regarding status of the cutting operation, i.e., whether the cutting operation is successful or a fault has occurred.

IV. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A cutting tool comprising:
 a body;
 two blades coupled to the body;
 an actuator coupled to the body and configured to cause the two blades to move relative to each other; and
 a controller coupled to the body, wherein the controller is in wireless communication with a remote device, and wherein the controller is configured to perform operations comprising:
  receiving a first signal from the remote device indicating a request to operate the cutting tool remotely,
  receiving information indicating that a trigger coupled to the body has been locked in an "on" state,
  sending a second signal to the remote device indicating that the trigger has been locked in the "on" state, and
  in response to receiving a third signal from the remote device, causing the actuator to move the two blades relative to each other to cut a cable placed there between.

2. The cutting tool of claim 1, wherein the operations further comprise:
 receiving a confirmation of the request to operate the cutting tool remotely; and enabling the cutting tool to be operated remotely in response to receiving the first signal and the confirmation.

3. The cutting tool of claim 2, wherein receiving the confirmation comprises:
prior to receiving the information indicating that the trigger has been locked in the "on" state, receiving information indicating that the trigger coupled to the body has been actuated indicating the confirmation of the request to operate the cutting tool remotely.

4. The cutting tool of claim 3, wherein the operations further comprise:
sending a signal to the remote device indicating that the trigger has been actuated and that the cutting tool is enabled to be operated remotely.

5. The cutting tool of claim 2, wherein enabling the cutting tool to be operated remotely is based on receiving the confirmation within a threshold period of time from receiving the first signal.

6. The cutting tool of claim 1, wherein the cutting tool further comprises a light indicator coupled to the body, and wherein the operations further comprise:
causing the light indicator to flash intermittently with a first frequency to indicate that the cutting tool is enabled to be operated remotely.

7. The cutting tool of claim 6, wherein the operations further comprise:
causing the light indicator to flash at a second frequency upon receiving the information indicating the trigger has been locked in the "on" state.

8. The cutting tool of claim 1, wherein the operations further comprise:
sending a signal to the remote device to indicate whether cutting the cable has been successful or an error has occurred.

9. The cutting tool of claim 1, wherein the controller is configured to operate the cutting tool in a normal mode or a remote-cut mode, wherein:
in the normal mode, the controller operates the actuator to cause the two blades to move relative to each other in response to the trigger being in the "on" state,
in the remote-cut mode, the controller operates the actuator to cause the two blades to move relative to each other in response to (i) receiving the third signal from the remote device, and (ii) the trigger being in locked in the "on" state, and
the operations further comprise:
switching the cutting tool from operating in the normal mode to the remote-cut mode in response to receiving at least the first signal.

10. The cutting tool of claim 9, wherein the operations further comprise:
determining that cutting the cable has been successful; and
responsively, switching the cutting tool from operating in the remote-cut mode into a normal operating mode.

11. The cutting tool of claim 1, further comprising:
a memory coupled to the controller, wherein the memory includes a unique identifier for the cutting tool so as to enable exclusive one-to-one communication between the cutting tool and the remote device.

12. The cutting tool of claim 11, wherein the unique identifier comprises a media access control (MAC) address.

13. The cutting tool of claim 1, wherein the controller is in wireless communication with the remote device by way of a Bluetooth communication protocol.

14. A system comprising:
a cutting tool, wherein the cutting tool comprises:
a body,
two blades coupled to the body, and
an actuator coupled to the body and configured to cause the two blades to move relative to each other; and
a device configured to remotely control the cutting tool, wherein the device comprises:
a user interface comprising a plurality of user interface items, and wherein:
in response to receiving information indicative of actuation of a first user interface item of the plurality of interface items, the device sends a first signal to the cutting tool so as to request enabling the cutting tool to be operated remotely,
in response to (i) receiving the first signal, and (ii) actuation of a trigger coupled to the cutting tool, the cutting tool sends a second signal to the device indicating that remote operation of the cutting tool has been enabled,
the cutting tool receives information indicating that the trigger has been locked in an "on" state, and responsively sends a third signal to the device indicating that the cutting tool is ready to perform a cutting operation, and
the device receives information indicative of actuation of a second user interface item of the plurality of interface items, and responsively, sends a fourth signal to the cutting tool so as to cause the cutting tool to perform the cutting operation.

15. The system of claim 14, wherein the cutting tool further comprises a memory that includes a unique a media access control (MAC) address for the cutting tool, and wherein the device is configured to accept signals only from the unique MAC address, such that the cutting tool and the device are configured to engage in an exclusive one-to-one communication.

16. A cutting tool system comprising:
a cutting tool,
a trigger physically onboard the cutting tool, the trigger capable of being actuated to as to initiate a cutting operation, and
a device physically disconnected from the cutting tool and that is configured to remotely control the cutting tool, wherein the trigger is configured to be locked in an on state so that the remote control may initiate a cutting operation.

17. The cutting tool system of claim 16, wherein the remote control receives feedback from the cutting tool regarding the cutting operation.

18. The cutting tool system of claim 17, wherein the remote control comprises a display for displaying information related to the cutting operation.

19. The cutting tool system of claim 18, wherein the displayed information related to the cutting operation relates to a successful cutting operation.

20. The cutting tool system of claim 16, wherein the device physically disconnected from the cutting tool is in wireless communication with the cutting tool.

21. The cutting tool system of claim 16, further comprising
a trigger lock that allows the trigger to be locked in the on state so that the remote control may be actuated so as to initiate the cutting operation.

* * * * *